US012686747B2

(12) United States Patent (10) Patent No.: US 12,686,747 B2
Jeon et al. (45) Date of Patent: Jul. 21, 2026

(54) GLASS FIBER REINFORCED POLYPROPYLENE RESIN COMPOSITION AND MOLDED ARTICLE COMPRISING THE SAME

(71) Applicants: Hyundai Motor Company, Seoul (KR); Kia Corporation, Seoul (KR); GS Caltex Corporation, Seoul (KR)

(72) Inventors: Sang Soo Jeon, Anyang (KR); Eun Chul Shin, Daejeon (KR); Seok Jin Yong, Daejeon (KR); Jae Jung Yoo, Daejeon (KR)

(73) Assignees: Hyundai Motor Company, Seoul (KR); Kia Corporation, Seoul (KR); GS Caltex Corporation, Seoul (KR)

( * ) Notice: Subject to any disclaimer, the term of this patent is extended or adjusted under 35 U.S.C. 154(b) by 634 days.

(21) Appl. No.: 18/074,929

(22) Filed: Dec. 5, 2022

(65) Prior Publication Data

US 2023/0203256 A1      Jun. 29, 2023

(30) Foreign Application Priority Data

Dec. 27, 2021    (KR) ........................ 10-2021-0188167

(51) Int. Cl.
*C08J 5/10* (2006.01)
*C08J 5/04* (2006.01)
*C08K 5/098* (2006.01)
*C08K 5/529* (2006.01)
*C08L 71/02* (2006.01)

(52) U.S. Cl.
CPC ................. *C08J 5/10* (2013.01); *C08J 5/043* (2013.01); *C08K 5/098* (2013.01); *C08K 5/529* (2013.01); *C08L 71/02* (2013.01); *C08J*
2371/02 (2013.01); *C08J 2451/06* (2013.01); *C08K 2201/014* (2013.01); *C08L 2201/02* (2013.01)

(58) Field of Classification Search
CPC .. C08J 5/10; C08J 5/043; C08K 5/098; C08K 5/529; C08L 71/02
See application file for complete search history.

(56) References Cited

U.S. PATENT DOCUMENTS

2017/0226327 A1* 8/2017 Kabeya .................... C08K 7/02
2017/0369673 A1* 12/2017 Zhou ........................ C08K 3/32

FOREIGN PATENT DOCUMENTS

| KR | 2008-0061077 | A | 7/2008 | |
|----|----|----|----|----|
| KR | 20100027316 | A | 3/2010 | |
| KR | 101278986 | B1 | 7/2013 | |
| KR | 2014-0027151 | A | 3/2014 | |
| KR | 101816875 | B1 * | 2/2018 | ........... E04F 15/107 |
| KR | 2019-0064875 | A | 6/2019 | |
| KR | 2021-0050612 | A | 5/2021 | |

OTHER PUBLICATIONS

English machine translation of KR101816875B1. (Year: 2018).*

* cited by examiner

*Primary Examiner* — John E Uselding
(74) *Attorney, Agent, or Firm* — Fox Rothschild LLP

(57) ABSTRACT

Disclosed are a polypropylene resin composition and a molded article including the same. The polypropylene resin composition may include a polypropylene resin, glass fiber, a non-halogen flame retardant, a compatibilizer, and sodium salt ionomer such that the resin composition may provide substantially improved mechanical properties such as tensile strength, impact strength, and flexural modulus, and excellent flame retardancy and flame retardant stability over time.

11 Claims, No Drawings

GLASS FIBER REINFORCED POLYPROPYLENE RESIN COMPOSITION AND MOLDED ARTICLE COMPRISING THE SAME

CROSS-REFERENCE TO RELATED APPLICATION

This application claims under 35 U.S.C. § 119(a) the benefit of priority to Korean Patent Application No. 10-2021-0188167 filed on Dec. 27, 2021, the entire contents of which are incorporated herein by reference.

TECHNICAL FIELD

The present invention relates to a polypropylene resin composition, a molded article and a vehicle including the same. In particular, the polypropylene resin composition may be a glass fiber reinforced polypropylene resin composition including a sodium salt ionomer, which can provide substantially improved flame retardancy while having excellent mechanical properties such as tensile strength, impact strength, and flexural modulus.

BACKGROUND

Polypropylene has been used as a molding material having excellent rigidity and heat resistance due to high crystallinity, having high tensile strength, having desirable electrical properties and chemical stability based on a resin structure, and easily molded, and has been widely used in various fields.

Recently, in order to be used in mechanical parts, structural materials, and applications exposed to high temperatures, a resin composition containing polypropylene as a main component is required to have greater rigidity and heat resistance. Therefore, in order to improve rigidity, dimensional stability, and heat resistance, a so-called glass fiber reinforced polypropylene resin composition in which glass fiber may be blended with a polypropylene resin composition has been tried.

Meanwhile, in order to impart flame retardancy in the battery module housing material for an electric vehicle, a metal material may be adopted, but a polymer composite material has been used in accordance with the demand for weight reduction.

However, in the case of most polymer composite materials, the cost of the flame retardant material may be high and weight reduction may be achieved to some extent, but the weight reduction degree is not sufficient due to the high specific gravity of glass fibers or inorganic fillers. Most polymer composite materials also have limitations in that the strength is not sufficient, the chemical resistance is poor, and the flame retardancy is not sufficiently secured to prepare for the risk of fire.

Therefore, under the above background, there is a need for development of a resin composition having excellent mechanical properties such as impact strength and excellent flame retardancy.

SUMMARY

In preferred aspects, provided are a glass fiber-reinforced polypropylene resin composition having excellent mechanical properties such as impact strength and excellent flame retardancy, and a molded article including the same.

The object of the present invention is not limited to the object mentioned above. The object of the present invention will become more apparent from the following description, and will be implemented by the means described in the claims and a combination thereof.

In an aspect, provided is a polypropylene resin composition (the "composition") including a polypropylene resin, glass fiber, a non-halogen flame retardant, a compatibilizer including a modified polypropylene grafted with maleic anhydride, and a sodium salt ionomer.

The polypropylene resin composition may suitably include an amount of about 30 to 70 wt % of the polypropylene resin, an amount of about 10 to 40 wt % of the glass fiber, an amount of about 10 to 40 wt % of the non-halogen flame retardant, an amount of about 1 to 5 wt % of the compatibilizer, and an amount of about 0.1 to 5 wt % of the sodium salt ionomer, based on the total weight of the polypropylene resin composition.

The "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a p oly ether-etherketone-b as ed polymer, a polyphenylquinoxaline-based polymer and a polystyrene-based polymer. Preferably, each of the ionomer or its subunit may contain an anionic polymer group at the pendant group or at the backbone and one or more cations.

The "compatibilizer" as used herein refers to a component in a resin composition that may improve the stability of a matrix (base resin) in the resin composition. The compatibilizer may be immiscible in the matrix, which may provide a system that stabilizes the blending of the resin components by creating interactions between the two immiscible polymers. In addition, the compatibilizer may implement properties that are generally not attainable in either single pure components (e.g., base resin and compatibilizer itself).

The polypropylene resin may include a propylene homopolymer.

The polypropylene resin may have a melt index of about 10 to 100 g/10 min (230° C., 2.16 kg).

The glass fiber may have a cross-sectional diameter of about 5 to 15 μm.

The non-halogen flame retardant may include one or more selected from the group consisting of phosphorus (P), nitrogen (N), and metal oxides.

The non-halogen flame retardant may include one or more selected from the group consisting of triphenyl phosphate, trimethyl phosphate, triethyl phosphate, bisphenol diphenyl phosphate, ammonium polyphosphate, melamine polyphosphate, melamine pyrophosphate, melamine ammonium phosphate, piperazine polyphosphate, xylenyl diphenyl phosphate, aromatic polyphosphate, magnesium oxide, zinc oxide, and aluminum oxide.

The compatibilizer may be grafted with about 5 to 10 wt % of maleic anhydride based on the total weight of the compatibilizer.

The sodium salt ionomer may suitably include an ethylene copolymer including one or more repeated carboxyl groups.

The sodium salt ionomer may suitably include 5-hydroxy-decanoate sodium salt.

The molded article may include the polypropylene resin composition as described herein.

The molded article may have a flame retardant grade of level V-0 when measured according to UL94.

The molded article may have an impact strength of about 7.6 to 8.2 KJ/m² when measured according to ISO 180.

Also provided is a vehicle including the polypropylene resin composition or the molded article as described herein.

Other aspects of the invention are disclosed infra.

DETAILED DESCRIPTION

The above objects, other objects, features, and advantages of the present invention will be easily understood through the following preferred embodiments related to the accompanying drawings. The present invention, however, is not limited to exemplary embodiments described herein and may also be embodied in other forms. On the contrary, exemplary embodiments introduced herein are provided to make disclosed contents thorough and complete and sufficiently transfer the spirit of the present invention to those skilled in the art.

It should be understood that term "comprise" or "have", etc. as used herein, specify the presence of features, numerals, steps, operations, components, parts described herein, or combinations thereof, but do not preclude the presence or addition of one or more other features, numerals, steps, operations, components, parts, or combinations thereof.

It should be understood that unless otherwise specified, all numbers, values, and/or expressions expressing ingredients, reaction conditions, polymer compositions, and the amount of formulations used herein, are approximations that reflect various uncertainties in measurement that arise in obtaining these values, among other things, and are therefore modified by the term "about" in all cases. In addition, when numerical ranges are disclosed herein, such ranges are continuous and include all values from a minimum value to a maximum value inclusive of the maximum value of such ranges, unless otherwise indicated. Furthermore, when such ranges refer to an integer, all integers from the minimum value to the maximum value inclusive of the maximum value are included, unless otherwise indicated.

In the present specification, when a range is described for a variable, it will be understood that the variable includes all values within the stated range including the stated endpoints of the range. For example, it may be understood that a range of "5 to 10" includes values of 5, 6, 7, 8, 9, and 10, as well as any subranges such as 6 to 10, 7 to 10, 6 to 9, 7 to 9, etc. and also any value between appropriate integers within the scope of the stated range, such as 5.5, 6.5, 7.5, 5.5 to 8.5 and 6.5 to 9, etc.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, for example, it may be understood that a range of "10% to 30%" includes values of 10%, 11%, 12%, 13%, etc. and all integers including up to 30%, as well as any subranges such as 10% to 15%, 12% to 18%, 20% to 30%, etc, and also any value between appropriate integers within the scope of the stated range, such as 10.5%, 15.5%, 25.5%, etc. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

The present invention relates to a polypropylene resin composition and a molded article including the same. In particular, the polypropylene resin composition ("composition") may include a glass fiber that reinforces the physical properties of the polypropylene resin composition. Preferable, the resin composition may include a polypropylene resin, glass fiber, a non-halogen flame retardant, a compatibilizer including a modified polypropylene grafted with maleic anhydride, and a sodium salt ionomer.

The polypropylene resin composition may suitably include an amount of about 30 to 70 wt % of the polypropylene resin, an amount of about 10 to 40 wt % of the glass fiber, an amount of about 10 to 40 wt % of the non-halogen flame retardant, an amount of about 1 to 5 wt % of the compatibilizer, and an amount of about 0.1 to 5 wt % of the sodium salt ionomer, wt % are based on the total weight of the composition.

Accordingly, each component constituting the polypropylene resin composition according to the present invention will be described in more detail as follows.

(a) Polypropylene Resin

The polypropylene resin may be included in an amount of about 30 to 70 wt % in the polypropylene resin composition, based on the total weight of the composition. Preferably, the polypropylene resin may be included in an amount of about 30 to 50% by weight and the content may be adjusted within a range that satisfies the mechanical properties as necessary.

The polypropylene resin may suitably include a propylene homopolymer.

The polypropylene resin may have a melt index of about 10 to 100 g/10 min (230° C., 2.16 kg, or particularly about 10 to 80 g/10 min (230° C., 2.16 kg). When the polypropylene resin has a melt index of less than about 10 g/10 min, tensile strength may be reduced, and when its melt index is greater than about 100 g/10 min (230° C., 2.16 kg), impact strength may be reduced.

Polypropylene resin has a low specific gravity of the resin itself due to the properties of the polymer material, so it has an excellent weight reduction effect compared to other polymer materials.

(B) Glass Fiber

The polypropylene resin may be included in an amount of about 10 to 40 wt % in the polypropylene resin composition, based on the total weight of the composition.

The glass fiber may suitably be included in an amount of about 10 to 30 wt %. When the content of the glass fiber is less than about 10 wt %, mechanical properties may be reduced, and when the content of the glass fiber is greater than about 40 wt %, dispersibility and processability may be degraded.

The glass fiber has a cylindrical shape and may have a cross-sectional diameter of about 5 to 15 μm. When the glass fiber has a cross-sectional diameter of less than about 5 μm, the dispersibility of the glass fiber may be lowered. On the other hand, when the glass fiber has a cross-sectional diameter of greater than about 15 μm, mechanical properties such as impact strength may be degraded.

(C) Non-Halogen Flame Retardant

The non-halogen flame retardant may be included in an amount of about 10 to 40 wt % in the polypropylene resin composition based on the total wight of the composition.

The non-halogen flame retardant may be included in an amount of about 10 to 20 wt % in the polypropylene resin composition. When the content of the non-halogen flame retardant is less than about 10 wt %, the flame retardant effect may not be sufficiently exhibited, and when the content of the non-halogen flame retardant is greater than about 40 wt %, mechanical properties may be degraded.

The non-halogen flame retardant may include one or more selected from the group consisting of phosphorus (P), nitrogen (N), and metal oxides.

The non-halogen flame retardant may include one or more selected from the group consisting of triphenyl phosphate, trimethyl phosphate, triethyl phosphate, bisphenol diphenyl phosphate, ammonium polyphosphate, melamine polyphosphate, melamine pyrophosphate, melamine ammonium phosphate, piperazine polyphosphate, xylenyl diphenyl phosphate, aromatic polyphosphate, magnesium oxide, zinc oxide, and aluminum oxide.

(D) Compatibilizer

The compatibilizer may improve interfacial adhesion between the polypropylene resin and the glass fiber.

The compatibilizer may be included in an amount of about 1 to 5 wt % in the polypropylene resin composition, based on the total weight of the polypropylene resin composition.

The compatibilizer may be included in an amount of about 1 to 2 wt % in the polypropylene resin composition. When the content of the compatibilizer is less than about 1 wt %, compatibility may be lowered, and when the content of the compatibilizer is greater than about 5 wt %, mechanical properties and heat resistance may be degraded.

The compatibilizer may be a modified polypropylene grafted with about 5 to 10 wt % of maleic anhydride based on the total weight of the compatibilizer.

(E) Sodium Salt Ionomer

The sodium salt ionomer may be included in an amount of about 0.1 to 5 wt % in the polypropylene resin composition, based on the total weight of the sodium salt ionomer.

The sodium salt ionomer may include an interpolymer of ethylene containing a carboxyl group.

The sodium salt ionomer may be present in the polypropylene resin composition as a sodium salt ($Na^+$), which is an ionic group moiety, and a polymer moiety having a repeating unit other than the sodium salt. Here, the sodium salt portion may exhibit properties such as hydrophilicity, thereby increasing dispersibility in the polypropylene resin composition.

In addition, the sodium salt ionomer may improve the compatibility between the polypropylene resin and the glass fiber, like the compatibilizer. In addition, the sodium salt ionomer may have an effect of improving the flame retardancy while improving the mechanical properties by increasing the impact resistance of the chain portion containing the carboxyl group having a repeating unit other than the sodium salt of the resin.

Preferably, as the sodium salt ionomer, a 5-hydroxydecanoate sodium salt may be used.

In another aspect, the present invention relates to a molded article including a polypropylene resin composition.

The molded article may have a flame retardant grade of level V-0 when measured according to UL94.

The molded article may have an impact strength of about 7.6 to 8.2 $KJ/m^2$ when measured according to ISO 180.

The molded article may be obtained by molding the polypropylene resin composition by a method such as extrusion molding, injection molding, compression molding, foam injection molding, foam low-pressure injection molding, or gas compression molding.

In addition, the molded article is not limited in the field of use, but may be used for the purpose of a molded article, for example, automobile parts, mechanical parts, electrical and electronic parts, office equipment such as computers, miscellaneous goods, etc. in a field where excellent mechanical properties such as tensile strength, impact strength, and flexural modulus are required, and flame retardancy is important. In particular, the molded article may be preferably applied as a material for the housing, etc, which collectively refers to various parts such as an end plate, a top cover, a side cover, etc. surrounding a battery cell of a battery module for a hybrid vehicle, a plug-in hybrid vehicle, and an electric vehicle.

Also provided is a vehicle including the polypropylene resin composition or the molded article including the same.

EXAMPLE

Hereinafter, the present invention will be described in more detail through specific Examples. The following Examples are only examples to assist the understanding of the present invention, and the scope of the present invention is not limited thereto.

Examples 1 to 2 and Comparative Examples 1 to 5

First, the polypropylene resin composition having the components and contents shown in Table 1 below was mixed using a super mixer, and melted and kneaded within a temperature range of 180 to 240° C. and a stirring speed range of 170 to 300 rpm using a twin screw extruder to prepare a specimen through extrusion processing.

TABLE 1

| Composition (wt %) | Example 1 | Example 2 | Comp. Example 1 | Comp. Example 2 | Comp. Example 3 | Comp. Example 4 | Comp. Example 5 |
|---|---|---|---|---|---|---|---|
| (A) Polypropylene resin | 47 | 45 | 50 | 48 | 49 | 43 | 41 |
| (B) Glass fiber | 30 | 30 | 30 | 30 | 30 | 30 | 30 |
| (C) Non-halogen flame retardant | 20 | 20 | 20 | 20 | 20 | 20 | 20 |
| (D) Compatibilizer | 2 | 2 | — | 2 | — | — | 2 |
| (E) Sodium salt ionomer | 1 | 3 | — | — | 1 | 7 | 7 |
| Total | 100 | 100 | 100 | 100 | 100 | 100 | 100 |

[Composition components]
(A) Polypropylene resin: propylene homopolymer resin of which a melt index measured at a temperature of 230° C. and a load of 2.16 kg is 60 g/10 min
(B) Glass fiber: Cylindrical glass fiber having an average diameter of 10 um
(C) Non-halogen flame retardant: nitrogen-phosphorus flame retardant (ADK STAB FP-2500S from ADEKA)
(D) Compatibilizer: Modified polypropylene grafted with 8 wt % of maleic anhydride
(E) Sodium salt ionomer: 5-hydroxydecanoate sodium salt

Experimental Examples

Physical properties were measured by the evaluation method according to the following items using the specimens for measuring physical properties prepared in Examples 1 to 2 and Comparative Examples 1 to 5. The results are shown in Table 2 below.
Evaluation Method
(1) Tensile strength: It was measured according to ISO 527 test method
(2) Flexural modulus: It was measured according to ISO 178 test method
(3) Impact strength: It was measured according to ISO 180 test method
(4) Flame retardancy: It was measured on a 1.5 mm-thick sample according to UL 94 vertical flame retardancy test
(5) Flame retardant stability over time (after 14 days): It was measured according to UL 94 vertical flame retardant test after leaving a 1.5 mm thick sample under a constant temperature/humidity condition of a temperature 23±2° C. and 50±5% relative humidity for 14 days.

component was mixed in an optimal content, so that the resin composition was measured to have a tensile strength of 82 to 84 MPa, a flexural modulus of 7,100 to 7,700 MPa, and an impact strength of 7.6 to 8.2 $KJ/m^2$, and had excellent mechanical properties.

In addition, Examples 1 and 2 showed a V-0 grade, which means the most excellent flame retardancy in a vertical flame retardancy test according to UL 94. In particular, Examples 1 and 2 showed the same V-0 grade even after 14 days under constant temperature/humidity conditions, indicating that the flame retardant stability over time was also very excellent.

Therefore, each component was included in an appropriate amount in the polypropylene resin composition according to various exemplary embodiments of the present invention, so that all properties were balanced and the quality was excellent.

On the other hand, Comparative Example 1 (without compatibilizer and sodium salt ionomer), Comparative Example 2 (without sodium salt ionomer), and Comparative Example 3 (without compatibilizer) had relatively poor

TABLE 2

| Physical properties | Example 1 | Example 2 | Comp. Example 1 | Comp. Example 2 | Comp. Example 3 | Comp. Example 4 | Comp. Example 5 |
|---|---|---|---|---|---|---|---|
| Tensile strength (MPa) | 82 | 84 | 74 | 78 | 75 | 69 | 79 |
| Flexural modulus (MPa) | 7,100 | 7,700 | 6,500 | 6,800 | 6,600 | 6,000 | 6,900 |
| Impact modulus ($KJ/m^2$) | 7.6 | 8.2 | 6.6 | 7.1 | 6.8 | 7.2 | 8.2 |
| Flame retardancy | V-0 | V-0 | V-1 | V-1 | V-1 | V-1 | V-1 |
| Flame retardant stability over time | V-0 | V-0 | V-2 | V-2 | V-1 | V-1 | V-1 |

As shown in Table 2, in Examples 1 and 2, a compatibilizer and a sodium salt ionomer were included, and each mechanical properties, such as tensile strength, impact strength, and flexural modulus, compared to the Examples.

In addition, the polypropylene resin composition was measured as V-1 to 2 grades in flame retardancy and flame retardant stability tests over time, and was inferior to that of Examples.

Also, in Comparative Example 4 (without compatibilizer, the content of the sodium salt ionomer was greater than 5% by weight), the tensile strength and flexural elasticity were significantly lowered, and the flame retardancy grade was also not excellent.

In addition in Comparative Example 5 (the content of the sodium salt ionomer was greater than 5% by weight), the impact strength was excellent, but the tensile strength, flexural modulus, and flame retardancy grade were relatively poor compared to Examples.

Therefore, when one or more of the compatibilizer and the sodium salt ionomer are not included, or the content is out of the range, mechanical properties and flame retardancy were measured to be relatively low compared to those of Examples.

Therefore, the polypropylene resin composition according to various exemplary embodiments of the present invention may have substantially improved mechanical properties such as tensile strength, impact strength, and flexural modulus, and excellent flame retardancy and flame retardant stability over time by appropriately mixing a polypropylene resin, glass fiber, a non-halogen flame retardant, a compatibilizer, and sodium salt ionomer in a specific amount.

The polypropylene resin composition according to various exemplary embodiments of the present invention may have substantially improved mechanical properties such as tensile strength, impact strength, and flexural modulus, and has excellent flame retardancy and flame retardant stability over time.

In addition, the polypropylene resin composition according to various exemplary embodiments of the present invention may have substantially improved mechanical properties and flame retardancy, and thus may be applied as a material for a battery module housing, and the like of a hybrid vehicle, a plug-in hybrid vehicle, and an electric vehicle.

Further, the molded article according to various exemplary embodiments of the present invention may have a low specific gravity of the resin itself due to the characteristics of the polypropylene resin, which is a polymer material, and thus has an excellent weight reduction effect compared to other polymer materials.

The effects of the present invention are not limited to the above-mentioned effects. It should be understood that the effects of the present invention include all effects that can be inferred from the above descriptions.

Although exemplary embodiments of the present invention have been described, those skilled in the art will understand that the present invention can be implemented in other specific forms without changing the technical spirit or essential features. Therefore, it is to be understood that Examples described hereinabove are illustrative rather than being restrictive in all aspects.

What is claimed is:

1. A polypropylene resin composition, comprising:
a polypropylene resin;
a glass fiber;
a non-halogen flame retardant;
a compatibilizer comprising a modified polypropylene grafted with maleic anhydride; and
a compound comprising a sodium salt,
wherein the polypropylene resin composition comprises:
an amount of 30 to 70 wt % of the polypropylene resin,
an amount of 10 to 40 wt % of the glass fiber,
an amount of 10 to 40 wt % of the non-halogen flame retardant,
an amount of 1 to 5 wt % of the compatibilizer, and
an amount of 0.1 to 5 wt % of the compound comprising a sodium salt,
all the wt % based on the total composition,
wherein compound comprising a sodium salt comprises a 5-hydroxydecanoate sodium salt.

2. The polypropylene resin composition of claim 1, wherein the polypropylene resin comprises a propylene homopolymer.

3. The polypropylene resin composition of claim 1, wherein the polypropylene resin has a melt index of 10 to 100 g/10 min (230° C., 2.16 kg).

4. The polypropylene resin composition of claim 1, wherein the glass fiber has a cross-sectional diameter of 5 to 15 μm.

5. The polypropylene resin composition of claim 1, wherein the non-halogen flame retardant comprises one or more selected from the group consisting of triphenyl phosphate, trimethyl phosphate, triethyl phosphate, bisphenol diphenyl phosphate, ammonium polyphosphate, melamine polyphosphate, melamine pyrophosphate, melamine ammonium phosphate, piperazine polyphosphate, xylenyl diphenyl phosphate, aromatic polyphosphate, magnesium oxide, zinc oxide, and aluminum oxide.

6. The polypropylene resin composition of claim 1, wherein the compatibilizer is grafted with 5 to 10 wt % of maleic anhydride based on the total weight of the compatibilizer.

7. A molded article comprising the polypropylene resin composition of claim 1.

8. The molded article of claim 7, wherein the molded article has a flame retardant grade of level V-O when measured according to UL94.

9. The molded article of claim 7, wherein the molded article has an impact strength of 7.6 to 8.2 KJ/m2 when measured according to ISO 180.

10. A vehicle comprising the polypropylene resin composition of claim 1.

11. A vehicle comprising the molded article of claim 7.

* * * * *